Feb. 7, 1928.
W. TREWHELLA
1,658,661
TIRE PRESSURE GAUGE
Filed April 9 1927
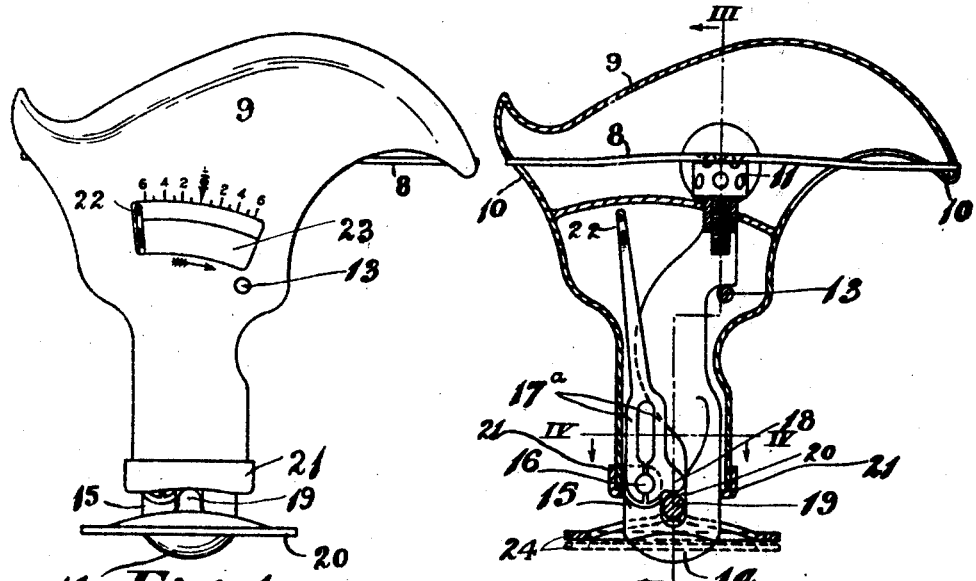
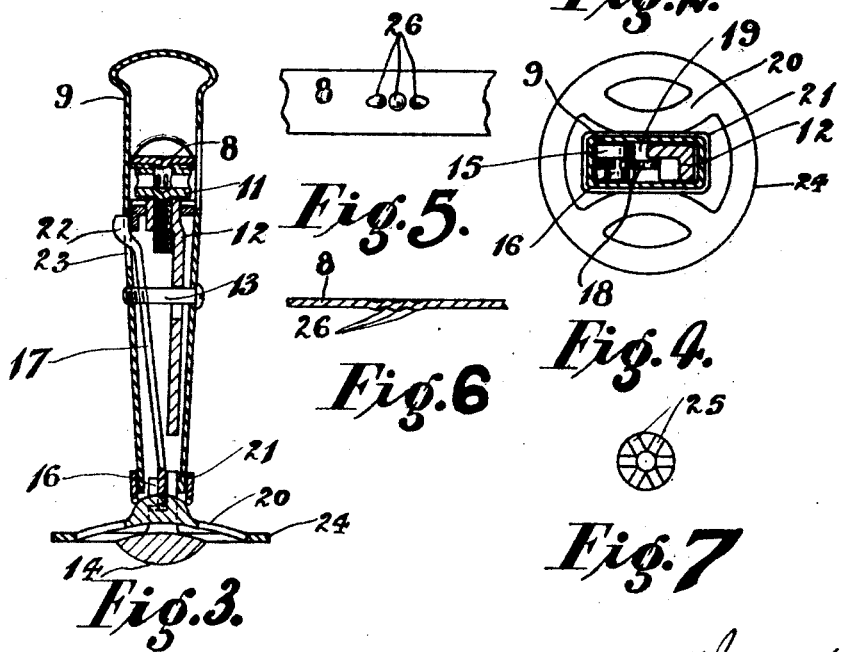

Patented Feb. 7, 1928.

1,658,661

UNITED STATES PATENT OFFICE.

WILLIAM TREWHELLA, OF TRENTHAM, VICTORIA, AUSTRALIA.

TIRE-PRESSURE GAUGE.

Application filed April 9, 1927. Serial No. 182,493.

The present invention refers to air pressure gauges or indicators for pneumatic tires of the class which are applied to the surface of the tire and specifically to the type in the said class wherein a tire contact member and a tire depression member co-act, through the medium of a spring and a manually depressible member, to actuate an indicator member.

For an example of the type mentioned of an air pressure indicator for pneumatic tires reference may be made to my United States Letters Patent 1,593,318.

The present invention consists of improvements in the form of air pressure indicator illustrated in Figures 7, 8 and 9, of the specification of the beforementioned patent which improvements will now be described with reference to the accompanying drawings and claimed in the appended claims.

In these drawings:—

Figures 1 and 2 are a side elevation and a vertical section respectively, of an air pressure indicator according to this invention.

Figures 3 and 4 are sections on the lines III—III and IV—IV respectively in Figure 2.

Figures 5 and 6 are a plan and a longitudinal central section respectively of the central portion of the leaf spring housed in the manually depressible member of the indicator.

Figure 7 is a plan view of the head of a capstan screw for adjusting the tension of the said leaf spring.

The leaf spring 8 is housed in the manually depressible member 9 the ends being held in the slots 10 in the latter whilst the central portion is supported and tensioned by the head of the capstan screw 11 screwed into the upper end of the stem of the tire depression member 12 which is supported against the reactionary pressure of the spring 8 by the transverse pin 13 held in the manually depressible member 9.

The lower end of the tire depression member 12 has a convexed button termination 14 for tire depression purposes and the said end is returned upwardly to form the finger 15 having the projecting pivot pin 16 on which is mounted for rotation thereon the index finger 17.

The said index finger 17 is frictionally rotatable upon the pin 16 as by means of the split construction illustrated the two limbs 17ª so formed being slightly sprung apart to receive the pin 16 thereby setting up a gripping tension and ensuring that no free movement of the said index finger 17 will occur.

The said index finger 17 is provided at its lower end with a lug 18 which lies in the path of the raised central bar 19 of the tire contact member 20, the said bar 19 having free slidable movement in the open slot 20 between the finger 15 and the lower end of the stem of the tire depression member 12.

A cap piece 21 is fitted to the lower end of the manually depressible member 9.

The free end 22 of the said index finger 17 is outwardly curved (see particularly Figure 3) to terminate in the arcuate slot 23 in one wall of the manually depressible member 9. The upper edge of the said slot 23 corresponds concentrically with the arc of movement performed by the said free end 22 of the index finger 17 and the said edge is so positioned relative to the latter that it will during functioning of the gauge contact with and retain the latter in the pressure indicating position as will be hereinafter explained.

In the drawings the movable parts of the gauge are shown in the position assumed by the same after application to a pneumatic tire which is considerably below the normal air pressure or in other words is "soft".

With the parts in the position stated it will be necessary before again applying the gauge to a tire for the user to move the free end 22 of the index finger 17 in the direction of the arrow in Figure 1, to the opposite end of the arcuate slot 23. The said index finger 17 being moved into the position stated brings the working face or rim portion 24 of the tire contact member 20 almost into line with the outermost portion of the button termination 14 of the tire depression member 12, as shown in dotted lines in Figure 2.

When the gauge is applied to the surface of a pneumatic tire and pressure imparted to the manually depressible member 9 the tire depression member 12 is forced into the tire whilst the tire contact member 20 remains stationary upon the tire surface. The relative movement which consequently occurs between the said tire contact member 20 and the tire depression member 12 causes the former by means of its central bar 19 engaging with the lug 18 to actuate and cause the index finger 17 to move in a direction opposite to the arrow in Figure 1.

The movement mentioned will continue so long as force is applied to cause continuance of the movement of the tire depression member 12 into the tire, and when a predetermined degree of force is reached the spring 8 will yield. As soon as the said yielding movement occurs the manually depressible member 9 will move towards the lower end of the tire depression member 12 and cause the upper edge of the arcuate slot 23 to engage the free end 22 of the index finger 17 the position of which latter in said slot will indicate the tire pressure.

In the above described form of my invention I select a normal tire depression depth, a convenient depth being $\frac{3}{32}$ of an inch, and design the gauge to register at a "normal" or correct pressure mark on the edge of the arcuate slot 23 and when that amount of tire depression has been effected, it is then a matter of adjustment, in accordance with the particular tires on which the gauge is to be used, so that the spring 8 will yield under the application of a pressure, applied to the manually depressible member 9, sufficient to effect the said amount of tire depression. Apart from the contained air pressure in a tire two other factors affecting the relation between the force applied and the resultant depression in the tire, viz, the stiffness of the walls of the tire and the degree of convexity of the button formation 14 on the outer end of the tire depression member 12. The latter is easily arranged while the former requires adjustment of the tension of the spring 8 as by application to a tire which has been correctly inflated to a known air pressure, or with a standard tire pressure gauge. The said tension may be varied by the use of springs of varying degrees of resistance or by means of the capstan headed screw 11 supporting the spring 8.

To retain the capstan screw 11 against movement when adjusted, a series of crossed diametrical slots 25 are formed in the outer face of same to engage with depressions 26 in the central portion of the spring 8.

I claim:—

1. An air pressure indicator for pneumatic tires comprising in combination, a manually depressible handle, a leaf spring housed in said handle, a tire depression member, said spring interposed between and acting against said handle and the said member, a capstan headed screw adjustable in the said member and bearing against and tensioning said spring, and a stop in said handle for supporting the said member against the reactionary pressure of said spring.

2. An air pressure indicator for pneumatic tires comprising in combination, a manually depressible handle, a spring housed in the said handle, a tire depression member, said spring interposed between and acting against said handle and the said member, means on said member for varying the tension of said spring, said tire depression member terminating at its outer end in an upturned finger having a pivot pin, an index finger frictionally rotatable on said pivot pin, a tire contact member loosely dependent from the said outer end of said tire depression member, and means on the said contact member for engaging and actuating the said index finger.

3. An air pressure indicator for pneumatic tires comprising in combination, a manually depressible handle, a spring housed in the said handle, a tire depression member, said spring interposed between and acting against said handle and the said member, means on said member for varying the tension of said spring, said tire depression member terminating at its outer end in an upturned finger having a pivot pin, an index finger frictionally rotatable on said pivot pin, a tire contact member loosely dependent from the said outer end of said tire depression member, means on the said contact member for engaging and actuating the said index finger, an arcuate slot in said manually depressible member one edge of the said slot engaging with the free end of the said index finger to retain the latter in the pressure indicating position.

4. An air pressure indicator for pneumatic tires comprising a manually depressible handle forming a housing, a spring in said housing, a tire depression member, said spring acting against the handle and said member, a pivoted lever on said member, a tire contact member having a raised central portion on which said lever is fulcrumed, a graduated sector on said housing and a pointer on said lever arranged to frictionally engage said graduated sector.

Dated this 28th day of February, 1927.

W. TREWHELLA.